June 29, 1937.  R. V. BURDICK  2,085,631
HINGE ASSEMBLY FOR CAST METAL MEMBERS
Filed March 13, 1936    2 Sheets-Sheet 1
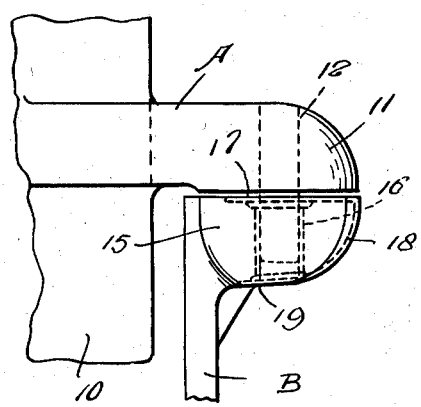
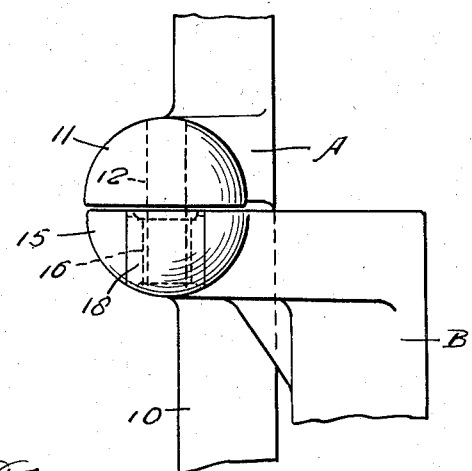
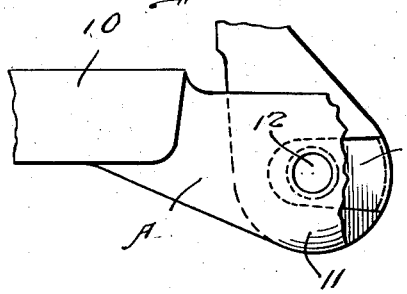
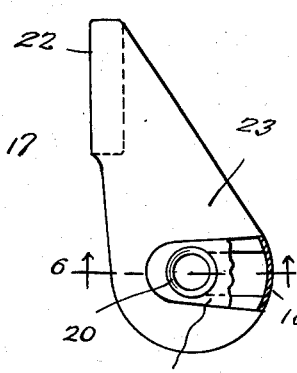
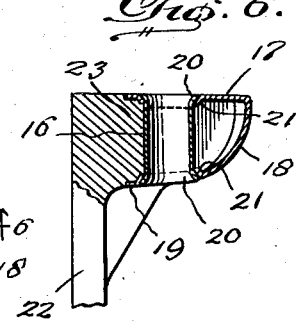
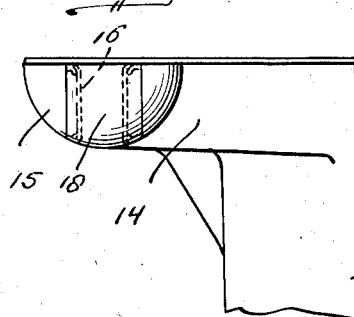
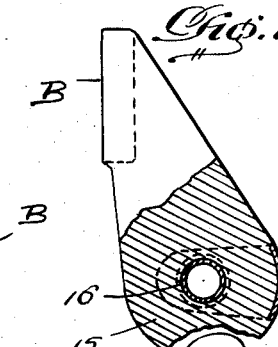
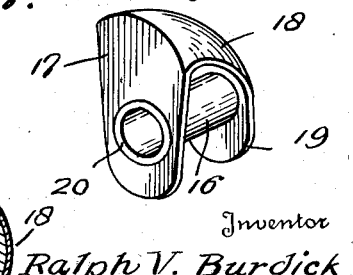
Inventor
Ralph V. Burdick,
By Edward N. Geyger
Attorney June 29, 1937. R. V. BURDICK 2,085,631
HINGE ASSEMBLY FOR CAST METAL MEMBERS
Filed March 13, 1936  2 Sheets-Sheet 2

Inventor
Ralph V. Burdick,
By Edward N. Geayer
Attorney

Patented June 29, 1937

2,085,631

UNITED STATES PATENT OFFICE 2,085,631

HINGE ASSEMBLY FOR CAST METAL MEMBERS

Ralph V. Burdick, Albany, N. Y.

Application March 13, 1936, Serial No. 68,763

2 Claims. (Cl. 16—128)

The instant invention has reference to a bearing bushing and carrier therefor primarily intended for use with bearing knuckles of cast metal stoves and furnaces, and contemplates a structure wherein each pair of coacting knuckles unitedly define a spherical design so that the rounded surfaces can be enameled, the rounded surfaces of the coacting knuckles prohibiting chipping off of the enamel which usually occurs about the sharp corners and edges of such knuckles in present day use.

The invention therefore comprehends the provision of a metallic bushing and carrier therefor of novel construction, which as a unit can be readily incorporated in the bearing knuckle to receive the hinge pin carried by the other coacting knuckle and thereby eliminate the necessity and expense of drilling openings to receive the hinge pin, as well as to insure accurate alignment of the coacting knuckles.

More specifically stated, the invention aims to provide a bushing and carrier therefor of the above mentioned character, wherein the carrier is formed from a single blank of material and characterized with a wall which is both longitudinally and transversely arched to accommodate itself to the semi-spherical shaped knuckle with which it is associated, with said wall lying flush with the rounded surface of the knuckle so that the latter in its entirety can be enameled for the purpose above mentioned and without any possibility of the enamel chipping off.

Other objects and advantages will become apparent when the following detailed description is read in connection with the accompanying drawings, the invention residing in the construction, combination and arrangement of parts as claimed.

In the drawings forming part of this application, like numerals of reference indicate similar parts in the several views and wherein:

Figure 1 is a front elevation of the invention.

Figure 2 is a side elevation thereof.

Figure 3 is a top plan view with the door knuckle partly broken away.

Figure 4 is a plan view of a knuckle pattern with the bushing and carrier therefor associated therewith and partly broken away.

Figure 5 is a view in elevation of Figure 4.

Figure 6 is a sectional view on line 6—6 of Figure 4.

Figure 7 is a top plan view of one of the knuckles partly in section showing the bushing and carrier associated therewith.

Figure 8 is a perspective view of the bushing and carrier therefor.

Figure 9:
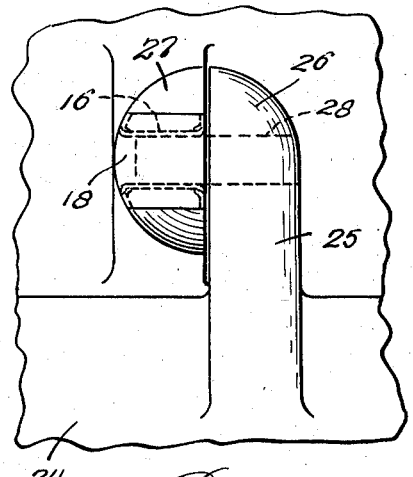
Figure 9 is a view similar to Figure 1 but showing a horizontally mounted assembly.
Figure 10:
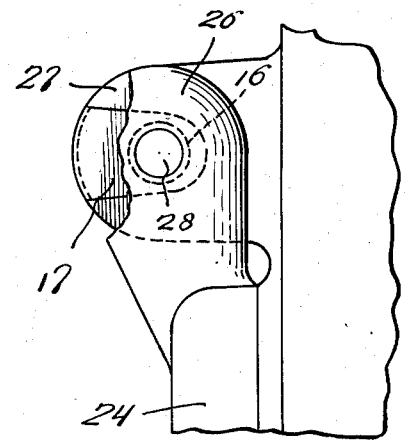
Figure 10 is a side elevation of Figure 9.
Figure 11:
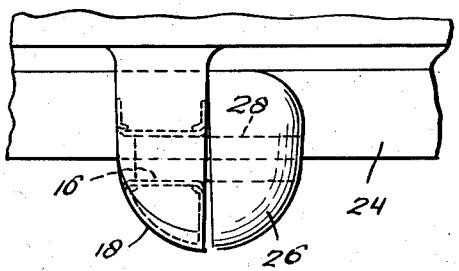
Figure 11 is a top plan view thereof.

Referring to the drawings in detail, and more particularly to Figures 1 to 8 inclusive, I have illustrated the preferred embodiment of the invention, and wherein A and B indicate generally the coacting knuckles of a cast metal door and door frame respectively and mounted in vertical alignment.

The knuckle A embodies an arm projecting laterally from the door 10 and terminates in a substantially semi-spherical shaped lug 11 from which depends the hinge pin 12. The knuckle B is preferably in the nature of a bracket suitably attached to or forming an integral part of the door frame. The bracket includes a horizontally disposed extension 14 terminating in a semi-spherical shaped lug 15 disposed in confronting relation to the similarly shaped lug 11 of the coacting knuckle A. By virtue of the smooth rounded surfaces of the coacting semi-spherical shaped lugs 11 and 15 respectively, it is manifest that this part of the knuckle, which is wholly exposed to view can be enameled for the purpose just stated, and without any possibility of the enamel being chipped off incident to the opening and closing of the door.

The instant invention comprehends the provision of a bushing and carrier therefor, which as a unit can be easily and readily incorporated in one of the coacting knuckles, and in accordance with one embodiment of the invention this unit is of the construction illustrated in Figure 8. The bushing is indicated at 16 and can vary in size to accommodate any particular size hinge pin 12. The carrier for the bushing is formed from a single blank of material and of a design to permit of its ready association with the semi-spherical shaped lug 15 of the door frame knuckle B. The bushing carrier essentially embodies a flat wall 17 adapted to repose upon the flat side of the semi-spherical shaped lug 15 as illustrated. This wall 17 is slightly tapered and projecting from the widest end thereof is a wall 18 which is longitudinally and transversely arched for the major portion of its length, thus accommodating itself to the rounded surface of the semi-spherical shaped lug 15 as shown. The free end of the wall 18 is extended to provide a substantially flat portion 19 disposed in spaced confronting relation to the flat wall 17. The walls 17 and 19 are provided with aligned openings to receive the ends of the bushing 16. The ends of the hinge tube are formed with flanges 20 secured to the shoulders 21 of the opposed walls 17 and 19 of the carrier, and in this manner the ends of the bushing are countersunk and lie flush with the surfaces of said walls. As clearly illustrated the bushing carrier is wholly countersunk in the lug 15 to lie flush with the surfaces thereof, thus not only prohibiting any displacement of the carrier or any relative movement between the associated parts, but also permitting the rounded surface of the lug 15 to be smoothly enameled for the purpose above stated.

In practice, the bushing and carrier therefor as a unit is initially associated with a pattern 22 for the particular knuckle, the lug 23 of the pattern being slotted to receive the bushing 16 as shown in Figures 4 to 6 inclusive. The walls of the carrier are countersunk in the lug 23 of the pattern to prevent slippage thereof in the mold, and thereby assure accuracy of alignment of the bushing 16 of the molded product with the pin carried by the coacting knuckle. It is of course obvious that the bushing and carrier therefor as a unit is permanently secured to the molded bearing knuckle.

In Figures 9 to 13 inclusive I have illustrated the invention on a horizontally mounted assembly in contradistinction to the vertical arrangement shown in Figure 1. The construction of the coacting knuckles are the same as above described. Projecting vertically from the door 24 is an arm 25 terminating in a semi-spherical shaped bearing knuckle 26. The knuckle of the door frame also includes a coacting semi-spherical shaped lug 27 which projects laterally therefrom and disposed in confronting relation to the bearing knuckle 26. The hinge pin 28 projects from the bearing knuckle 26 and received by the hinge tube 16 permanently secured within the coacting lug 27. The construction of the bushing 16 and carrier therefor is exactly the same as shown in Figure 8, the longitudinally and transversely arched wall 18 of the carrier accommodating itself to the rounded surface of the lug 27 and countersunk to lie flush therewith.

Figures 12, 13:
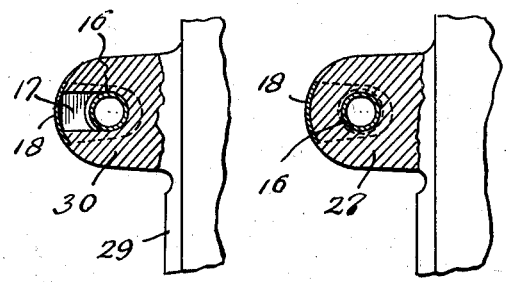
Figure 12 is a plan view of the knuckle pattern partly broken away and showing the bushing and carrier associated therewith.
Figure 13 is a top plan view of the knuckle partly in section showing the bushing and carrier therefor associated therewith.
Figure 14:
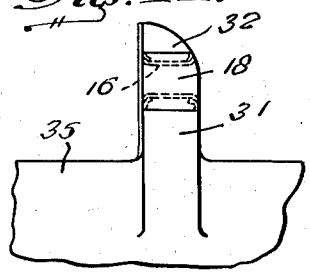
Figure 14 is a front elevation showing the invention associated with the knuckle of a door, in contradistinction to Figure 1.
Figure 15:
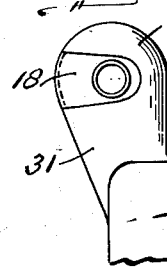
Figure 15 is a side elevation of Figure 14.
Figures 17, 18:
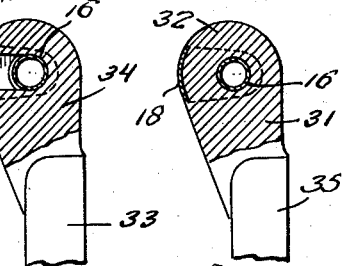
Figure 17 is an elevation of the door knuckle pattern partly in section and showing the invention associated therewith.
Figure 18 is a similar view of the door knuckle.
Figure 16:
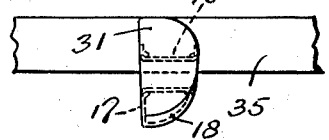
Figure 16 is a plan view thereof.

Figure 12 illustrates the initial association of the bushing and carrier therefor with the pattern 29 of the door frame knuckle, the lug 20 of which pattern is slotted to receive the bushing 16, while Figure 13 illustrates how this unit is permanently secured to the molded knuckle for use.

In Figures 14 to 18 inclusive I have shown the invention associated with the knuckle of a door in contradistinction to the knuckle of the door frame as illustrated in the other views. Otherwise the invention is of the same construction as shown in Figure 8 and above described. The door knuckle includes an arm 31 projecting from the door 35 and terminates in a semi-spherical shaped lug 32. The pattern 33 for said knuckle is provided with a slotted lug 34 to receive the bushing 16, the carrier for said bushing embracing the lug 34 and countersunk therein. Consequently the combined bushing and carrier is permanently secured to the knuckle when molded, with the longitudinally and transversely arched wall 18 of the carrier embracing and lying flush with the rounded surface of the lug 32.

While it is believed that from the foregoing description the nature and advantages of the invention will be thoroughly understood, I desire to have it known that I do not limit myself to what is herein shown or described, and that such changes may be made as fall within the scope of what is claimed.

What I claim is:

1. The combination with a substantially semi-spherical-shaped knuckle of a cast metal plate, of a bushing and carrier therefor adapted to be molded with said knuckle, said carrier including a substantially flat wall, a transversely and longitudinally arched wall extended from one end of said flat wall and embracing said knuckle flush with the surface thereof, and extended to provide a substantially flat portion disposed in confronting relation with said flat wall and connected with the latter by said bushing.

2. As a new article of manufacture, a bushing and carrier therefor as a unitary structure, said carrier including a substantially flat wall, a transversely and longitudinally arched end wall extended to provide a substantially flat portion disposed in spaced confronting relation to said flat wall and connected with the latter by said bushing.

RALPH V. BURDICK.